J. P. BETHKE AND R. H. STEARNS.
MAGNETIC SEPARATING PROCESS AND APPARATUS.
APPLICATION FILED JUNE 11, 1919.
1,414,170.
Patented Apr. 25, 1922.
4 SHEETS—SHEET 1.
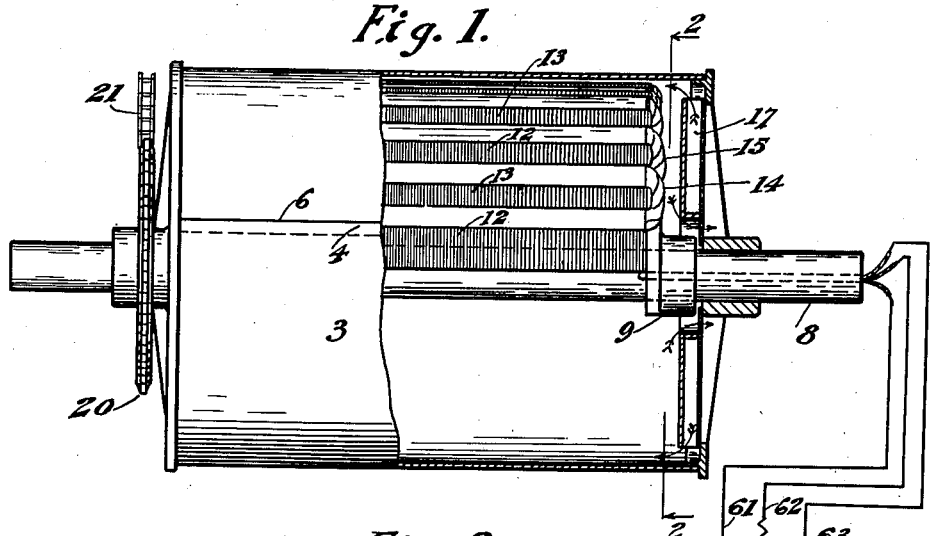
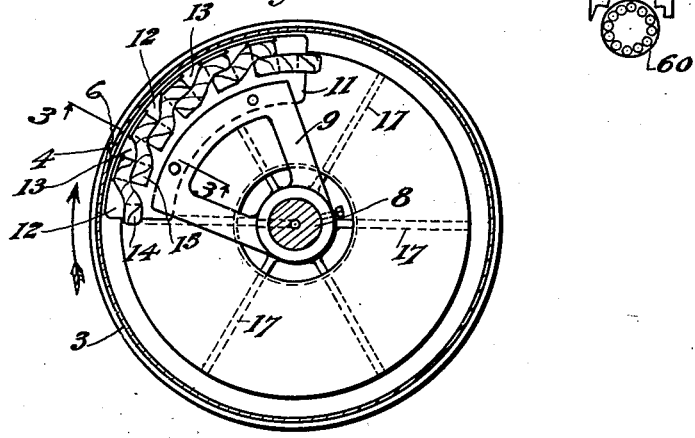
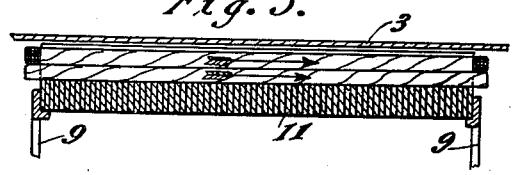
Inventor
John P. Bethke
Roswell H. Stearns
By Erwin Wheeler & Woolard
Attorneys

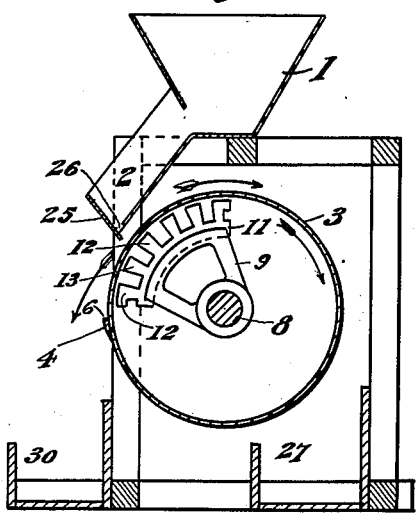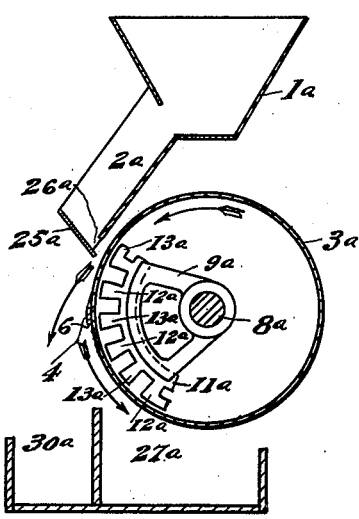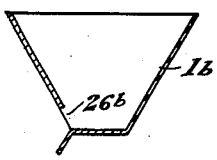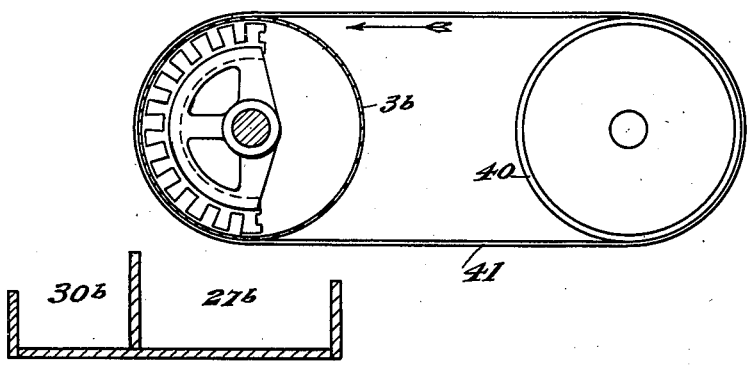

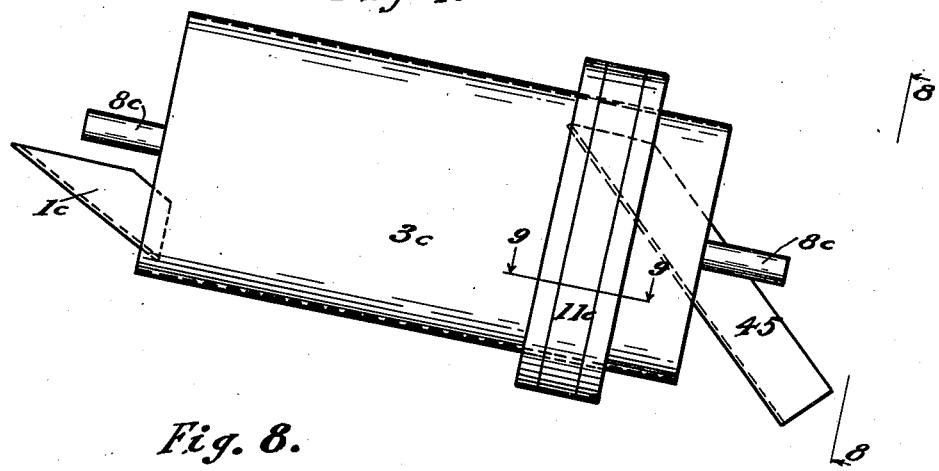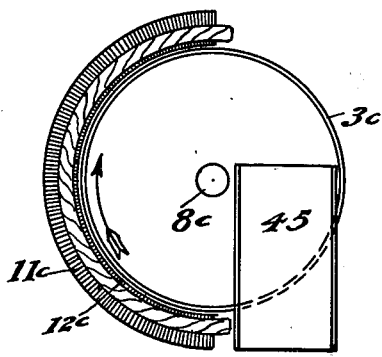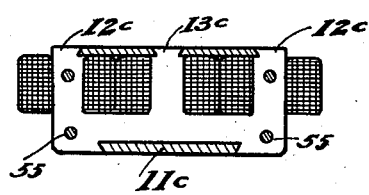

J. P. BETHKE AND R. H. STEARNS.
MAGNETIC SEPARATING PROCESS AND APPARATUS.
APPLICATION FILED JUNE 11, 1919.

1,414,170.  Patented Apr. 25, 1922.
4 SHEETS—SHEET 4.

UNITED STATES PATENT OFFICE.

JOHN P. BETHKE AND ROSWELL H. STEARNS, OF MILWAUKEE, WISCONSIN.

MAGNETIC SEPARATING PROCESS AND APPARATUS.

1,414,170.	Specification of Letters Patent.	Patented Apr. 25, 1922.

Application filed June 11, 1919. Serial No. 303,423.

*To all whom it may concern:*

Be it known that we, JOHN P. BETHKE and ROSWELL H. STEARNS, citizens of the United States, residing at Milwaukee, county of Milwaukee, and State of Wisconsin, have invented new and useful Improvements in Magnetic Separating Processes and Apparatus, of which the following is a specification.

Our invention relates to improvements in magnetic separating processes and apparatus.

The object of our invention is to provide means for utilizing an alternating current to subject mechanically moving magnetizable material to a pulsating magnetic pull, i. e., to provide a magnetic field of pulsating or varying intensity in which the effect upon the material is similar to that which would result from a pulsating direct current without change of polarity, and to pass the material through such a field under the influence of gravity or upon an apron which supports and actuates it while allowing the material to readjust itself under the influence of successive waves of magnetic energy which cause the magnetizable particles to shake out or release entrained non-magnetic particles, and allow them to be delivered separately.

Our invention is adaptable to substantially all common types of magnetic separators by reconstruction of the magnet as hereinafter set forth, in order that an alternating electrical current may be used, in the manner and for the purposes described.

In the drawings.

Figure 1 is a side view, partly in longitudinal section, of a magnetic separator drum provided with an interior alternating current magnet embodying our invention in its preferred form, and showing the windings connected with a source of alternating current supply.

Figure 2 is a cross sectional view of the same taken on line 2—2 of Figure 1.

Figure 3 is a sectional view on line 3—3 of Figure 2 with arrows indicating the direction of current flow in the windings.

Figure 4 is a similar view to Fig. 2 on a reduced scale, with a feeding hopper and delivery spout in assembled relation to the drum and with the energizing coils omitted to more clearly show the form of the pole pieces.

Figure 5 is a similar view showing a slight modification.

Figure 6 is a similar view illustrating conventionally the use of our invention in a separator of the endless belt and pulley type.

Figure 7 is a conventional side elevation of a drum separator of the axially inclined, interior feed type, with our invention applied thereto.

Figure 8 is an end view of the same on line 8—8 of Figure 7.

Figure 9 is a detail view of one of the laminations and its associated winding taken on line 9—9 of Fig. 7, showing the pole pieces, winding, and mounting in cross section.

Like parts are identified by the same reference characters throughout the several views, with letters added to indicate the similar parts in the various modifications.

*The process.*

Figure 10:
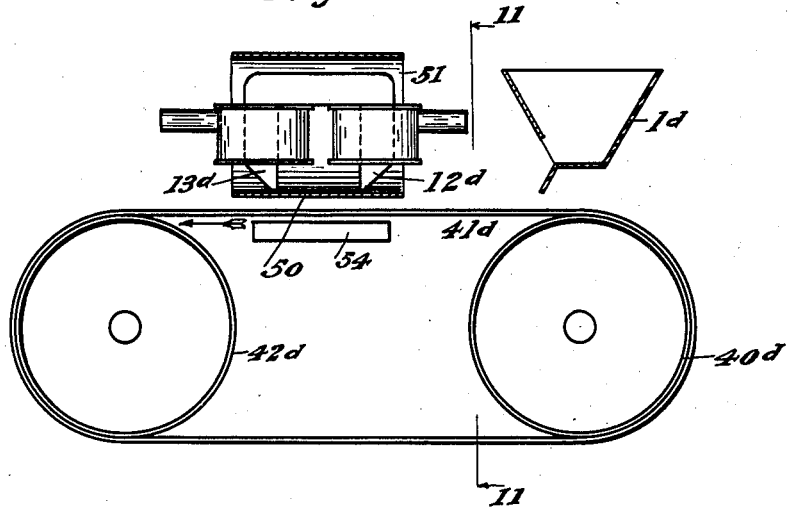
Figures 10 and 11 are conventional illustrations showing our invention embodied in a conveyor type of separator.

Our improved process is based upon the discovery that instead of utilizing the alternating current to provide a traveling electro-magnetic field which will progressively draw the magnetite out of the path along which the non-magnetic materials travel, either by gravity or by means of a conveyor, such a current can be utilized to develop a field in which the effect upon the material is the same as a pulsating stationary field, in which the magnetic pulsations in each pole piece are sufficiently rapid notwithstanding the fact that when the current reverses and takes a direction opposite to that taken when the polarity was initially established, so that the particles of material do not have time to fall from the conveyor, or corresponding member.

While the reduction in intensity may be such as to nearly release weakly magnetic material, the low intensity may be so quickly followed by the next high intensity wave or pulsation as to prevent the magnetic material from discharging with that which is non-magnetic, and the slight movements which develop in the magnetic material during the low intensity period are instantly followed by a quick jerky movement as the particles are re-arranged under the influence of the recurring strong pull of the highly energized pole.

For example, it is plainly observable in our improved process that at the crest of the high intensity wave, elongated particles tend to stand on end upon a conveyor which supports them above the pole piece, or in some cases, where they are of sufficient length, they tend to bridge the gap between the pole pieces. But in the succeeding period of low intensity the up ended particles tend to fall over, and the bridging particles tend to be pushed along by the non-magnetic material or other conveying force, out of bridging position. Then, when the current again reverses and restores the intensity of the field, the particles snap back into the same or new positions of energetic retention, and all of these movements are very effective in shaking out entrained non-magnetic material.

We find that this principle can be utilized in a great variety of ways to effect a cleaner separation than is possible to accomplish with direct current separators. The volume of current required is somewhat greater, but this is a negligible factor, since the total current consumption is small, and efficient separation is the primary consideration.

We have also discovered that by our improved process it is possible to temporarily at least impart dia-magnetic qualities to certain metals, such for example as aluminum and its alloys and we utilize this fact also in promoting the desired separation.

In carrying out our process, we pass the material through an electro-magnetic field having parallel poles of opposite polarity preferably extending transversely to the path along which the material travels, and we rapidly vary the intensity of the field by passing an alternating current through the energizing winding. The alternations should be of such frequency as to prevent any falling particles of magnetite from acquiring material momentum. We support the material upon a mechanically actuated conveyor or set of conveyors which travel in such a manner as to tend to mechanically carry the magnetite in one direction while either carrying the non-magnetic material in another direction or allowing it to drop by gravity away from the magnetite. By utilizing the pulsating magnetic pull due to the varying energy of the pole pieces, and by also utilizing the agitation in the particles thereby produced and by further utilizing the diamagnetic force developed as above described, all in connection with mechanical means for urging the magnetite out of the magnetic field in the direction of its desired delivery, a more thorough separation may be accomplished than was heretofore believed possible.

Our process is further explained in the following description of apparatus adaptable for our purposes.

*Apparatus.*

Referring to Figures 1, 2, 3 and 4, it will be observed that the material is fed from a hopper 1 through a chute 2 over the upwardly moving side of a drum, the peripheral wall 3 of which is lapped at 4, with the outer margin forming a longitudinally extending shoulder 6 facing in the direction of drum rotation.

A stationary shaft 8 supports the drum and is provided with a set of segmental brackets 9 within the drum which support an arcuate magnet composed of laminated plates disposed in a longitudinally extending series and arranged to form a base 11 and parallel pole pieces 12 and 13.

The conductor windings 14 and 15 extend longitudinally in the channels between the pole pieces and obliquely across the ends of the pole pieces as clearly shown in Figure 2, there being two superposed sets of windings in each channel, and the conductors of the inner set being extended obliquely across the pole piece ends and forming the outer set in the next channel. The electric current is passed through the windings in such a manner as to flow in the same direction in both sets of conductors in each channel and in an opposite direction in the next channel, whereby the successive pole pieces will be of opposed polarity. The frequency of alternation in any ordinary alternating current generator will be sufficient for our purposes.

Fan blades 17, preferably secured to one or both end walls of the drum, are adapted to deliver currents of air through the drum and particularly the gap between the magnetic poles and the drum, and also through the spaces between the bracket arms. Thorough ventilation is desirable for the reason that considerable heat is generated when the current is working in opposition to the magnetic flux as hereinafter explained, and unless good ventilation is secured, or the heat otherwise disposed of, the efficiency of the separator will be impaired. The drum may be actuated from any suitable source of power, by means of a sprocket wheel or pulley 20, and a chain or belt 21.

It will be observed in Figure 4 that the hopper or chute 2 is provided with an end wall 25 which extends below the bottom, with a small gap at 26 between it and the bottom wall. The end wall 25 is adapted to check the momentum of the material sliding down through the chute 2 from the hopper 1, and to direct this material in a slowly moving stream against the surface of the drum at a point opposite the magnet.

In the construction shown in Figures 1, 2, 3 and 4, the magnet is supported by the shaft 8 within the upper half of the drum on the upwardly moving side, and the directing feed wall 25 delivers the material to the drum a little below the longitudinal center line of the magnet. The non-magnetic material slides down the face of the drum until it reaches a point where it can drop vertically to the ground, or into a suitable receptacle 30. The magnetizable material tends to remain in fixed relation to the nearest pole piece, but it is brought into contact with the moving surface of the drum, the friction of which tends to carry it upwardly and over the top of the drum, as indicated by the upper exterior arrow in Figure 4.

On the other hand, after each reversal in the direction of the current which tends to neutralize the magnet, the material tends to drop by gravity in the direction taken by the non-magnetic material. Some of the magnetite will move slightly in that direction before the next reversal in the direction of the current restores the intensity of the field. Therefore, under the influence of the drum friction and the pulsating magnetic pull, the particles of magnetizable material will be in almost constant motion. Some of these particles will adhere to the drum sufficiently to be carried upwardly from pole to pole to the top of the drum. But if the drum is smooth surfaced, many of the particles will remain in substantially the same position with reference to the magnet, although in continuous vibration, until the shoulder 6 comes in contact with them, and pushes them upwardly over the top of the drum, and beyond the magnetic field, after which they are allowed to drop into a receiver 27.

If the drum is not smooth surfaced, its friction may be found sufficient to effect the delivery of the magnetizable material into the receiver 27. But where the surface of the drum is smooth, it will usually be found necessary in this type of separator to employ some form of rib or projection, such as the longitudinally extending shoulder 6.

In Figure 5, the drum $3^a$ revolves in the direction indicated by the interior arrow. The magnet is in all respects the same as that illustrated in Figures 1, 2, 3, and 4, except in location. The hopper $1^a$, chute $2^a$, and directing wall $25^a$ may be substantially the same in structure and arrangement.

But it will be observed that the magnet is located largely in the lower quadrant of the drum on the descending side, the uppermost pole $13^a$ being located substantially opposite the outlet $26^a$ of the chute $2^a$. In this form of construction, the non-magnetic sand and other material drops vertically in a bin $30^a$, whereas the magnetizable material is carried partially underneath the drum, and drops in the receiver $27^a$.

The length of the arc occupied by the magnet is not material, if a non-magnetic strip or zone is provided within which the material may leave the surface of the drum, and drop into the receiver provided for such material. In Figure 6, the drum $3^b$ constitutes one member of a set of pulleys or rollers $3^b$ and 40, about which a belt or apron 41, composed of non-magnetizable material, is adapted to travel. In this construction a hopper $1^b$ can be directly provided with an outlet $26^b$, which discharges upon the horizontally moving portion of the apron 41 in any suitable manner, the apron carrying the material in the direction indicated by the interior arrow, and ultimately passing through the magnetic field within the pulley $3^b$. In this construction the non-magnetic material drops into the bin $30^b$, and the magnetizable material into the bin $27^b$.

In Figures 7 and 8, a drum $3^c$ is employed, this drum being supported upon an inclined shaft $8^c$, and the material to be separated being fed into the drum through a hopper $1^c$. This drum revolves as indicated by the interior arrow in Figure 8, thereby constantly serving as a mechanical elevator to progressively lift material on the upwardly moving side of the drum into a magnetic field established by an exterior electro-magnet having a base $11^c$, and having arcuate pole pieces $12^c$ and $13^c$ extending substantially from the lower side of the drum to the upper side, with the ends of the pole pieces approximately in a vertical plane which includes the drum axis. The magnetizable material follows the pole pieces to the upper end thereof, whereupon it is carried over and beyond the magnetic field until it drops into a chute 45, projecting outwardly from the lower end of the drum, and delivers the magnetizable material to a suitable point of discharge.

It will be observed in Figures 8 and 9 that the laminations in this form of construction constitute the core portion of the magnet, the coil covers and base being formed of separate arcuate strips of material.

Figure 11:
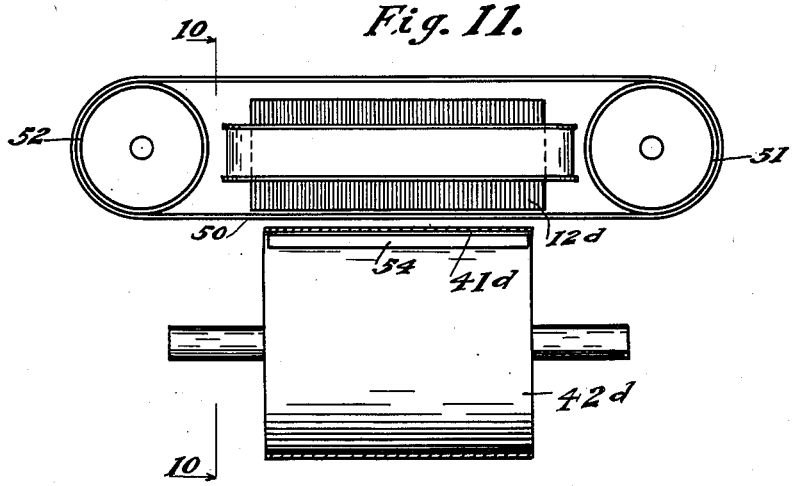

In Figures 10 and 11, the hopper $1^d$ is associated with a conveyor belt or apron $41^d$ running over pulleys $40^d$ and $42^d$ in substantially the same manner as in Figure 6, but the magnet is located above the central portion of the apron $41^d$, with its pole pieces $12^d$ and $13^d$ projecting downwardly into proximity to the apron $41^d$ with an auxiliary transversely moving apron 50 interposed. This apron 50 is arranged to run over rollers 51 and 52, as best shown in Figure 11. In this form of construction the energizing coil is wound about the depending legs of the magnet, the lower ends of which legs constitute the working polar projections of the magnet, whereby the magnetizable material may be lifted from the conveyor apron 41$^d$, and carried transversely to a suitable point of discharge by the apron 50. It is desirable in this instance to provide an induced magnet, composed of a magnetizable bar 54, extending transversely of the apron 41$^d$, along the underside of the upper portion of said apron, and spanning the gap between the pole pieces 12$^d$ and 13$^d$, whereby the lines of force of the magnetic field will pass through the apron in substantially a vertical direction.

It will be understood that the various forms of construction illustrated in the drawings, differ from the direct current magnetic separators in common use principally by having the core members and pole pieces laminated, i. e., composed of a series of flat plates having magnetizable material secured together in any suitable manner, such, for example, as the bolts or rivets 55, shown in Figure 9; also in the fact that the windings in each case extend longitudinally around the pole pieces. The arrangement is such that the pole pieces will alternate, but the current in adjacent windings will always flow in the same direction between adjacent pole pieces.

Further, a higher degree of heat absorption will be required, and in structures where the surface of the carrier is smooth, and its movement is across the pole pieces, it will be found necessary, or at least desirable, to provide means whereby the carrier may mechanically engage the magnetizable material, and carry it out of the magnetic field, either continuously or periodically.

It will of course be understood that while I have only indicated an alternating current generator 60 in the Figure 1 with conductors 61, 62 and 63 (the generator illustrated being a three phase generator) leading from the generator to the windings through a suitable passage in the shaft 8, each of the several forms of construction illustrated, is to be connected with a similar source of alternating current for energizing the magnets.

We claim:—

1. The method of separating magnetic from non-magnetic materials, consisting in passing the mixed material into an electromagnetic field, periodically reversing the direction of the energizing current to produce cycles of varying magnetic intensity and direction, allowing the non-magnetic material to pass continuously out of the field, and mechanically removing the magnetized material from the field independently of agitation due to said current reversals.

2. The method of separating magnetic from non-magnetic material, consisting in passing the mixed material into an electromagnetic field having energizing windings through which an alterating current is passing, subjecting the magnetizable material to a succession of the variations in the intensity and direction of the field derived from the reversals of the energizing current, allowing the non-magnetic material to pass freely out of the field in one direction, and mechanically removing the magnetized material in another direction while it is being subjected to said pulsating magnetic attraction.

3. The method of separating magnetic from non-magnetic material, consisting in utilizing an alternating current to provide a magnetic field having polar members of varying polarity with rapidly varying intensity, mechanically conveying the mixed material in a thin stream through the magnetic field in proximity to said polar members, magnetically supporting the magnetizable material in opposition to gravity, and mechanically conveying it, while so supported, in a different direction from that taken by the non-magnetic material, while partially releasing the magnetizable material at rapidly recurring intervals of low intensity, to allow shifting movements of the particles under the influence of gravity followed by forcible rearrangements thereof due to the successive reversals of magnetic polarity.

4. An alternating current magnetic separator, including the combination of a set of laminated pole pieces, polyphase windings thereon to provide adjacent pole pieces of opposite polarity, a conveyor traversing the magnetic field of said pole pieces, and adapted to receive the pressure of the magnetized material while allowing the non-magnetic material to drop by gravity therefrom, means for distributing mixed material to the conveyor; and means for supplying an alternating current to said coils.

5. An alternating current magnetic separator, including the combination of a revolving conveyor, an arcuate electro-magnet having laminated pole pieces, polyphase windings thereon to provide adjacent pole pieces of opposite polarity extending along lines transverse to the line of conveyor movement, and in proximity to one side of the conveyor, means for feeding material to the other side of the conveyor, and means for passing an alternating current through the energizing coils to produce a magnetic field of varying intensity, said conveyor being adapted to support magnetized material in said field in a position to allow the non-magnetic material to drop away from it while the remaining material is being vibrated by the variations in magnetic flux.

6. An alternating current magnetic separator, including the combination of a revolving conveyor, an arcuate electro-magnet having laminated pole pieces provided with energizing coils wound to provide adjacent pole pieces of opposite polarity, extending along lines transverse to the line of conveyor movement, and in proximity to one side of the conveyor, means for feeding material to the other side of the conveyor, means for passing an alternating current through the energizing coils to produce a magnetic field of varying intensity and direction, said conveyor being adapted to support magnetized material in said field in a position to allow the non-magnetic material to drop away from it while the remaining material is being vibrated by the variations in magnetic flux, and said conveyor being provided with means for mechanically engaging the magnetized material to push it along the line of conveyor movement to a suitable point of delivery.

7. In an alternating current magnetic separator, the combination of a set of laminated parallel pole pieces arranged with intervening channels to receive energizing coils, and two sets of windings in each channel, arranged with those of one set extending around one pole piece and those of the other set extending around another pole piece, and means for passing an alternating current through the sets of coils.

8. In an alternating current magnetic separator, the combination of a set of laminated parallel pole pieces arranged with intervening channels to receive energizing coils, and two sets of superposed windings in each channel, arranged with those of one set extending around one pole piece and those of the other set extending around another pole piece, means for passing an alternating current through the sets of coils, said windings being passed obliquely across the ends of the pole pieces whereby the coil having one portion at the base of a channel is disposed in the next channel in superposed relation to the next coil.

In testimony whereof we affix our signatures in the presence of two witnesses.

JOHN P. BETHKE.
ROSWELL H. STEARNS.

Witnesses:
O. C. WEBER,
A. J. McKERIHAN.